1,469,101

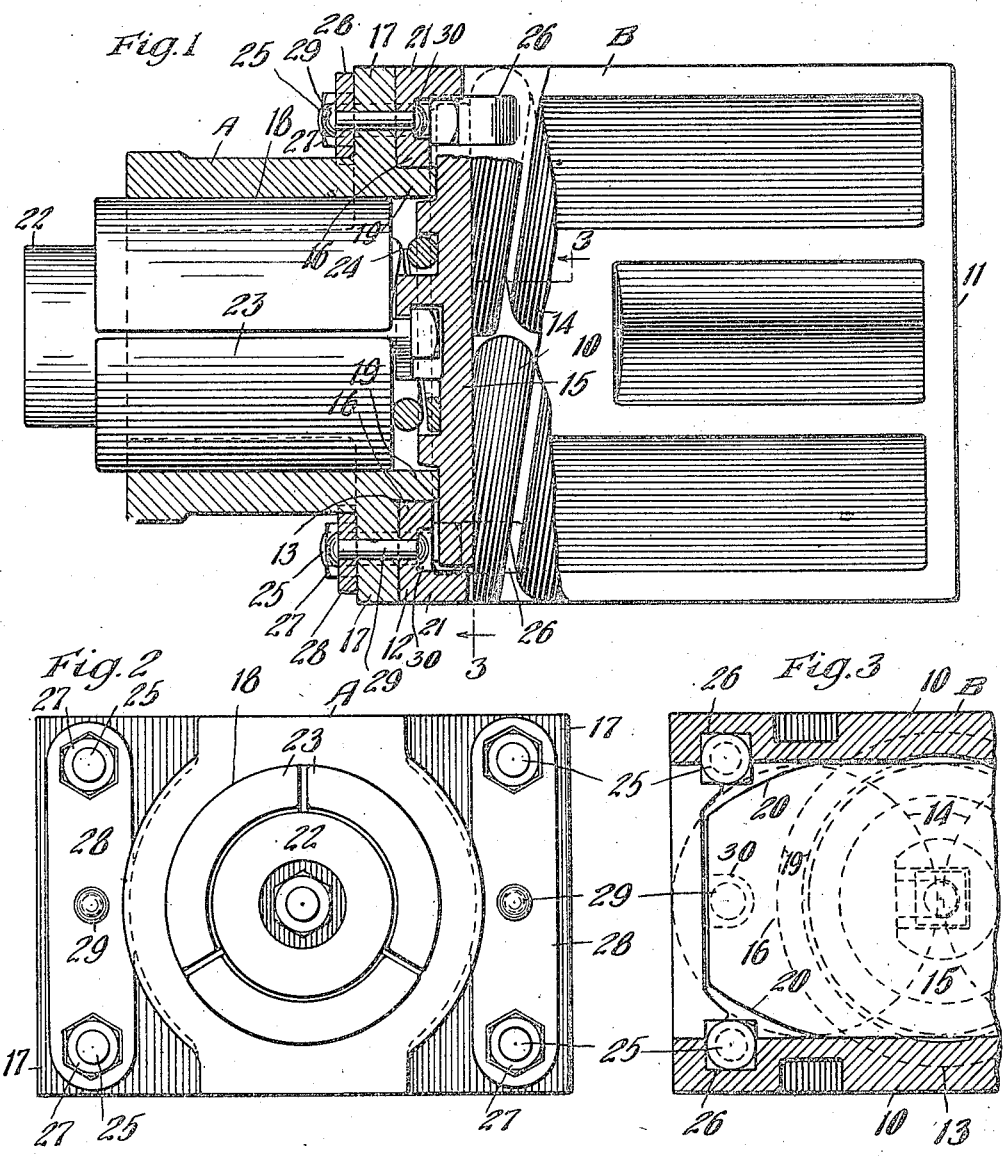
Sept. 25, 1923.
J. F. O'CONNOR
1,469,101
FRICTION SHELL AND SPRING CAGE FOR DRAFT GEARS
Filed Dec. 14, 1922
Witnesses
Wm. Geiger
Inventor
John F. O'Connor
By Geo. I. Haight
His Atty Patented Sept. 25, 1923.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHELL AND SPRING CAGE FOR DRAFT GEARS.

Application filed December 14, 1922. Serial No. 606,928.

*To all whom it may concern:*

Be it known that I, JOHN F. O'CONNOR, a citizen of the United States, residing at Chicago, in the county of Cook and State of Illinois, have invented a certain new and useful Improvement in Friction Shells and Spring Cages for Draft Gears, of which the following is a full, clear, concise, and exact description, reference being had to the accompanying drawings, forming a part of this specification.

This invention relates to improvements in friction shell and spring cage for draft gears.

The object of the invention is to provide an economical and simple arrangement for attaching a friction shell to a spring cage whereby the connection is made rigid and durable and so disposed as to avoid any interference with any of the interior elements of the draft gear and without curtailing any of the space for the interior parts.

In the drawing forming a part of this specification, Figure 1 is a part longitudinal central section, part elevational view of a friction draft gear showing my improvements in connection therewith. Fig. 2 is a front end elevational view of the draft gear shown in Fig. 1. And Fig. 3 is a broken transverse sectional view corresponding to the section line 3—3 of Fig. 1.

In said drawing, the friction shell proper is indicated by the reference character A and the spring cage by the reference character B. The broad arrangement of shell and cage corresponds to a well known type of friction draft gear and more particularly one of that general class employing twin spring resistances.

The spring cage proper B, as shown, is of rectangular cross-section having top and bottom walls 10—10, rear wall 11 and a front wall 12, the latter having a circular opening 13 therein, centrally located to accommodate the inner end of the shell proper A. The sides of the cage B are open for the greater portion of their length in order to permit of the insertion and removal of the twin coil spring resistances 14—14 and the twin spring follower 15, it being understood that the springs 14 are arranged side by side, as indicated in Figures 1 and 3. The front wall 12 of the cage B, being apertured as above described, provides, in effect, opposed inwardly extending flanges 16—16 over which are adapted to be superimposed corresponding diametrically opposed lateral flanges 17—17 formed integral with the shell A.

The shell proper A, for the main part, is of cylindrical form to provide an interior cylindrical friction surface 18, the cylindrical portion being extended inwardly beyond the flanges 17 as indicated at 19—19, said inward extension fitting within the opening 13 provided in the front end of the cage B.

The twin spring follower 15 is of more or less rectangular outline but curved at the four corners thereof as indicated at 20—20 in Fig. 3. Said follower 15 is left of sufficient area to overlie almost, but not quite, the entire ends of the two springs 14. Said follower 15 is adapted to move within the short side walls 21—21 of the cage B, but normally will be held spaced from the inner faces of the flanges 16, by engaging the inner edge of the shell A, as best shown in Figure 1.

Within the shell A, I have shown friction elements of a well known type, the same consisting of a central pressure transmitting wedge 22; three friction shoes 23 arranged in a circular series and a preliminary spring 24 interposed between the follower 15 and interior shoulders on the shoes 23.

To rigidly unite the shell and cage, I employ the following means. In each corner of the assembled device, I employ a bolt 25 having the head end thereof disposed within the cage B and seated or countersunk in a recess 26 in the corresponding wall of the cage, as best shown in Fig. 3, it being observed that the head of the bolt is not only held against turning, but is clear of the corresponding adjacent curved corner 20 of the follower 15 so that said follower 15 may assume its normal position and without taking away any of the usual space for the follower or springs. The shank of each bolt 25 is extended through the overlapping flanges of the cage and shell and to the outer end of each bolt is applied a nut 27. Each pair of nuts 27 is held against turning by a lock plate 28, which is recessed to fit over the nuts of each pair, each plate 28 being in turn held against loss by a centrally disposed relatively light rivet 29, the inner ends of the rivets 29 being seated within suitable recesses 30 formed on the inner faces of the flanges 16 so that the said ends of said rivets will not interfere with the normal position of the spring follower. While the employment of the rivets 29 may be said, technically, to constitute permanent fastenings, nevertheless, they will be, in actual practice, made so light that they may easily be chipped off and replaced when it is desired to renew the friction shell or the spring cage, it being observed that the rivets 29 are not subject to any appreciable tension, their sole function being to hold the lock plates 28 in position.

With the arrangement shown and described, I obtain a very rigid and strong connection between the shell and cage, and one which is well adapted to withstand the forces which tend to separate the shell and cage during the release action of the mechanism. With my arrangement, should the shell wear out or become broken or the cage become injured in service either part may be readily replaced by another one, at a minimum cost.

I have herein shown and described what I now consider the preferred manner of carrying out my invention, but the same is merely illustrative and I contemplate all changes and modifications that come within the scope of the claims appended hereto.

I claim:

1. In combination; a friction shell having outwardly-extended flanges at one end thereof; a spring cage having flanges at one end thereof and over which the shell flanges are adapted to lie; securing bolts extending through the flanges and having the ends on the inner sides of the cage flanges recessed therewithin; and lock plates cooperable with the outer ends of said bolts.

2. In combination: a spring cage of rectangular cross-section having opposed inwardly extending flanges at one end thereof; twin arranged springs within said cage; a twin spring follower disposed between said flanges and the adjacent ends of the springs; a friction shell having flanges at its inner end overlying said flanges of the cage; and fastening elements extended through the flanges of the shell and cage, said fastening devices being disposed at the corners of the cage and outside of the periphery of said follower.

3. In combination: a spring cage having an end wall with a circular opening therein, said wall providing flanges at opposite sides thereof; a cylindrical friction shell having a portion thereof extending within said opening and provided with laterally extended flanges overlying said flanges of the cage; and four fastening elements extending through the flanges of the shell and cage and each located in a corner of the cage.

4. In combination: a spring cage having an end wall with a circular opening therein, said wall providing flanges at opposite sides thereof; a cylindrical friction shell having a portion thereof extending within said opening and provided with laterally extended flanges overlying said flanges of the cage; four fastening elements extending through the flanges of the shell and cage and each located in a corner of the cage, each of said fastening devices comprising a bolt having the head end thereof seated within a recess on the interior of the cage and a nut on the outer face of the shell flange; a lock plate cooperable with each pair of nuts, said lock plates being disposed on the outer face of the shell flanges; and means for holding said lock plates in place.

In witness that I claim the foregoing I have hereunto subscribed my name this 31 day of October, 1922.

JOHN F. O'CONNOR.

Witnesses:
H. M. DEAMER,
FRANCES SAVAGE.